United States Patent [19]
Ward et al.

[11] Patent Number: 5,701,294
[45] Date of Patent: Dec. 23, 1997

[54] SYSTEM AND METHOD FOR FLEXIBLE CODING, MODULATION, AND TIME SLOT ALLOCATION IN A RADIO TELECOMMUNICATIONS NETWORK

[75] Inventors: Torbjorn Ward, Montreal; Anders Sandell, Dollard-des-Ormeaux, both of Canada

[73] Assignee: Telefonaktiebolaget LM Ericsson, Stockholm, Sweden

[21] Appl. No.: 537,457

[22] Filed: Oct. 2, 1995

[51] Int. Cl.$^6$ .................................................. H04B 7/26
[52] U.S. Cl. ...................... 370/252; 370/337; 370/465; 455/67.1
[58] Field of Search ......................... 370/79, 13, 17, 370/95.1, 95.3, 84, 252, 321, 329, 332, 333, 336, 341, 465, 468, 347, 337, 442, 498; 371/5.1, 5.5; 455/34.1, 62, 63, 67.4, 67.1, 54.1, 33.2; 375/225, 227, 377, 285, 254

[56] References Cited

U.S. PATENT DOCUMENTS

| | | |
|---|---|---|
| 4,612,414 | 9/1986 | Juang . |
| 4,710,925 | 12/1987 | Negi .................................. 371/5.5 |
| 4,829,519 | 5/1989 | Scotton et al. ..................... 371/5.5 |
| 5,001,776 | 3/1991 | Clark ................................. 455/226.2 |
| 5,038,399 | 8/1991 | Bruckert ............................ 455/34.1 |
| 5,070,536 | 12/1991 | Mahany et al. ................... 370/84 |
| 5,134,615 | 7/1992 | Freeburg et al. . |
| 5,195,132 | 3/1993 | Bowker et al. ................... 379/410 |
| 5,257,401 | 10/1993 | Dahlin et al. ...................... 455/33.2 |
| 5,327,576 | 7/1994 | Uddenfeldt et al. ............... 455/33.2 |
| 5,375,123 | 12/1994 | Andersson et al. ................ 370/95.1 |

FOREIGN PATENT DOCUMENTS 0 627 827 A2  11/1994  European Pat. Off. .
WO 95/07578   3/1995   WIPO .

OTHER PUBLICATIONS

J. Woodard & L. Hanzo, "A Dual-rate Algebraic CELP-based Speech Transceiver,", IEEE, 1994, pp. 1690–1694.

*Primary Examiner*—Chau Nguyen
*Attorney, Agent, or Firm*—Smith & Catlett, P.C.

[57] ABSTRACT

A system and method for dynamically adapting the user bit rate of a time division multiple access (TDMA) cellular telecommunication system to achieve optimum voice quality over a broad range of radio channel conditions are disclosed. The system continuously monitors radio channel quality on both the uplink and the downlink, and dynamically adapts the system's combination of speech coding, channel coding, modulation, and number of assignable time slots per call to optimize voice quality for the measured conditions. Various combinations of the system's speech coding, channel coding, modulation, and assignable time slots are identified as combination types and corresponding cost functions are defined. By identifying and selecting the cost function with the lowest cost for the measured radio channel conditions, the system provides the maximum voice quality achievable within the limits of the system design.

12 Claims, 11 Drawing Sheets

SYSTEM AND METHOD FOR FLEXIBLE CODING, MODULATION, AND TIME SLOT ALLOCATION IN A RADIO TELECOMMUNICATIONS NETWORK

BACKGROUND OF THE INVENTION

1. Technical Field of the Invention

This invention relates to radio telecommunication systems and, more particularly, to a system and method for improving voice quality and radio channel quality through flexible coding, modulation, and time slot allocation.

2. Description of Related Art

In modern cellular telecommunication systems, the geographic area of coverage may be divided into a plurality of continuous radio coverage areas, or cells, each of which is served by one base station. Each of the base stations includes a transmitter, receiver, and a base station controller as are well known in the art. A Mobile Switching Center (MSC) is connected by communication links to each of the base stations and to the Public Switched Telephone Network (PSTN) or a similar fixed network which may include an Integrated Services Digital Network (ISDN) facility. Similarly, it is also known to include more than one MSC in the cellular radio system and to connect each additional MSC to a different group of base stations and to other MSCs via cables or radio links. A mobile station may roam freely about the service area. As mobile stations roam about the service area of the system, they are handed off from one cell to another so that there is no lapse in service.

Each of the cells is allocated a plurality of voice or speech channels and at least one access or control channel. The control channel is used to control or supervise the operation of the mobile terminal by means of information transmitted and received from those units, referred to as messages. Control and administration messages within a cellular radio system are sent in accordance with industry established air interface standards, such as AMPS and EIA/TIA 553, the standards for analog cellular operations, and/or D-AMPS, EIA/TIA 627, and TIA IS-136, the standards for digital cellular operations, all of which are hereby incorporated by reference herein. While these standards govern North American operations, similar standards govern other geographic areas throughout the world, and are well known to those skilled in the art.

The information exchanged between base stations and mobile terminals via messages, may include incoming call signals, outgoing call signals, paging signals, paging response signals, location registration signals, voice channel assignments, maintenance instructions and handoff instructions as the mobile terminals travel out of the radio coverage of one cell and into the radio coverage of other cells, as well as other additional items of information such as calling party numbers, time information, and the like. The control or voice channels may operate in either analog or digital mode or a combination thereof based upon industry standards. Integrated services between different cellular telecommunication systems and different MSCs are provided by using the intersystem specification IS-41, which is hereby incorporated by reference herein.

The growing number of mobile stations in use today has generated the need for more voice channels within cellular telecommunication systems. Base stations have become more closely spaced, with an increase in interference between mobile stations operating on the same frequency in neighboring or closely spaced cells. Additionally, since the frequency spectrum allocated to cellular telecommunications is finite, this has lead to more closely spaced channel frequencies along with an attendant increase in interference from other channels. Digital techniques such as time division multiplexing and code division multiplexing of signals have been developed in order to gain more useful channels from a given frequency spectrum.

There still remains a need to reduce interference, or more specifically, to increase the ratio of the carrier signal strength to interference strength, (i.e., carrier-to-interference (C/I) ratio). As used herein, C/I is defined as the total carrier-to-interference ratio, where interference comprises interference from other mobile stations as well as noise (both receiver-generated and thermal).

In cellular radio systems, the user bit rate is a finite resource. For a system with a given user bit rate, there is a trade-off between voice quality in error free conditions (high C/I ratio) and the system's robustness against poor radio channel quality (low C/I ratio). A system may give priority to either voice quality or robustness at the expense of the other characteristic. For example, a system with a user bit rate giving priority to voice quality in error-free conditions performs well at high C/I levels, but is less resistant to low C/I levels than a system with a user bit rate that gives priority to robustness. In other words, the voice quality of the first system deteriorates more rapidly as C/I levels decrease. Likewise, a system with a user bit rate giving priority to robustness is more resistant to low C/I levels, but does not perform as well at high C/I levels as a system with a user bit rate that gives priority to voice quality. In other words, the voice quality of the robust system deteriorates less rapidly as C/I levels decrease, but does not have as good a voice quality in good radio conditions.

The total user bit rate in a cellular radio system is determined by a selected combination of techniques for speech coding, channel coding, modulation, and for a time division multiple access (TDMA) system, the number of assignable time slots per call specified in the Air Interface standard. A fixed combination of the above techniques is defined by air interface standards such as IS-136. There are drawbacks, however, to having this combination specified because of constraints on achievable voice quality that arise from using a specified combination in inappropriate radio channel quality conditions. Each specified combination is optimized for a specific level of radio channel quality (C/I ratio), thereby sacrificing voice quality when the C/I ratio is high, and/or sacrificing robustness when the C/I ratio is low. The cellular air interface standards of today specify fixed combinations that either provide high voice quality in high C/I conditions, or provide robustness. The combination for high voice quality in high C/I conditions produces a system that is less robust, and the voice quality is unacceptably poor in low C/I conditions. The combination for robustness sacrifices high voice quality in high C/I conditions in exchange for acceptable voice quality in low C/I conditions, even though the robustness may be needed in only a limited number of cases when C/I conditions are low.

Although there are no known prior art teachings of a solution to the aforementioned deficiency and shortcoming such as that disclosed herein, a number of prior art references exist that discuss subject matter that bears some relation to matters discussed herein. Such prior art references are U.S. Pat. No. 5,134,615 to Freeburg et al., and an IEEE article by J. Woodard and L. Hanzo entitled, "A Dual-rate Algebraic CELP-based Speech Transceiver". Each of these references is discussed briefly below.

U.S. Pat. No. 5,134,615 to Freeburg et al. (Freeburg) discloses a method of selecting frequency and time slot assignments for communication with devices having different communication protocols, including different available time slots. An adaptable time slot selector is included, allowing communication with devices using other protocols. Freeburg, however, only addresses time slot allocation in the context of providing communications with devices utilizing different air interface protocols. Freeburg does not in any way teach or suggest a method of achieving improved voice quality in a digital cellular system over a broad range of C/I conditions. The present invention dynamically adapts a cellular system's combination of speech coding, channel coding, modulation, and number of assignable time slots per call to achieve the optimum voice quality for the currently measured C/I conditions.

The IEEE article by J. Woodard and L. Hanzo entitled, "A Dual-rate Algebraic CELP-based Speech Transceiver" (Woodard) discloses a system that utilizes two combinations of speech coding, channel coding, and modulation called Low-quality mode and High-quality mode. Woodard, however, does not teach or suggest any process for quality-driven or capacity-driven selection of the different modes. Woodard does not in any way suggest a system that dynamically adapts a cellular system's combination of speech coding, channel coding, modulation, and number of assignable time slots per call to achieve optimum voice quality over a broad range of C/I conditions.

Review of each of the foregoing references reveals no disclosure or suggestion of a system or method such as that described and claimed herein.

It would be a distinct advantage to have a system and method for dynamically adapting a cellular system's combination of speech coding, channel coding, modulation, and number of assignable time slots per call to achieve optimum voice quality over a broad range of C/I conditions. The present invention provides such a system and method.

SUMMARY OF THE INVENTION

The present invention is a system and method for dynamically adapting the user bit rate of a time division multiple access (TDMA) cellular telecommunication system to achieve optimum voice quality over a broad range of radio channel conditions. The system continuously monitors radio channel quality both on an uplink (from a mobile station to its serving base station) and on a downlink (from the serving base station to the mobile station), and dynamically adapts the system's combination of speech coding, channel coding, modulation, and number of assignable time slots per call to optimize voice quality for the measured conditions. Various combinations of the system's speech coding, channel coding, modulation, and assignable time slots are identified as combination types. In addition, cost functions may be introduced, and by identifying and selecting the cost function with the lowest cost for the measured radio channel conditions, the system provides the maximum voice quality achievable within the limits of the system design.

In another aspect, the present invention is a system for dynamically optimizing voice quality in a digital cellular radio telecommunications network having a plurality of user bit rate components that operate at set bit rates. The network utilizes a plurality of radio channels to carry calls. The system comprises means for monitoring and measuring conditions on each of the radio channels, means for estimating current radio channel quality for each of the radio channels, means for changing the bit rates of each of the plurality of user bit rate components, and means for dynamically controlling the means for changing bit rates in order to provide the maximum achievable voice quality for calls on each of the radio channels.

In still another aspect, the present invention is a method of dynamically optimizing voice quality in a time division multiple access (TDMA) cellular radio telecommunications network having a plurality of user bit rate components that operate at set bit rates. The network utilizes a plurality of time slots to carry a plurality of calls on each radio channel. The method begins by monitoring and measuring conditions on each of the radio channels, and estimating current radio channel quality for each of the radio channels. The method then dynamically changes the bit rates and allocates time slots based upon the estimated radio channel quality, thereby providing the maximum achievable voice quality for calls on each of the radio channels.

BRIEF DESCRIPTION OF THE DRAWINGS

The invention will be better understood and its numerous objects and advantages will become more apparent to those skilled in the art by reference to the following drawing, in conjunction with the accompanying specification, in which.

DETAILED DESCRIPTION OF EMBODIMENTS

Figure 1:
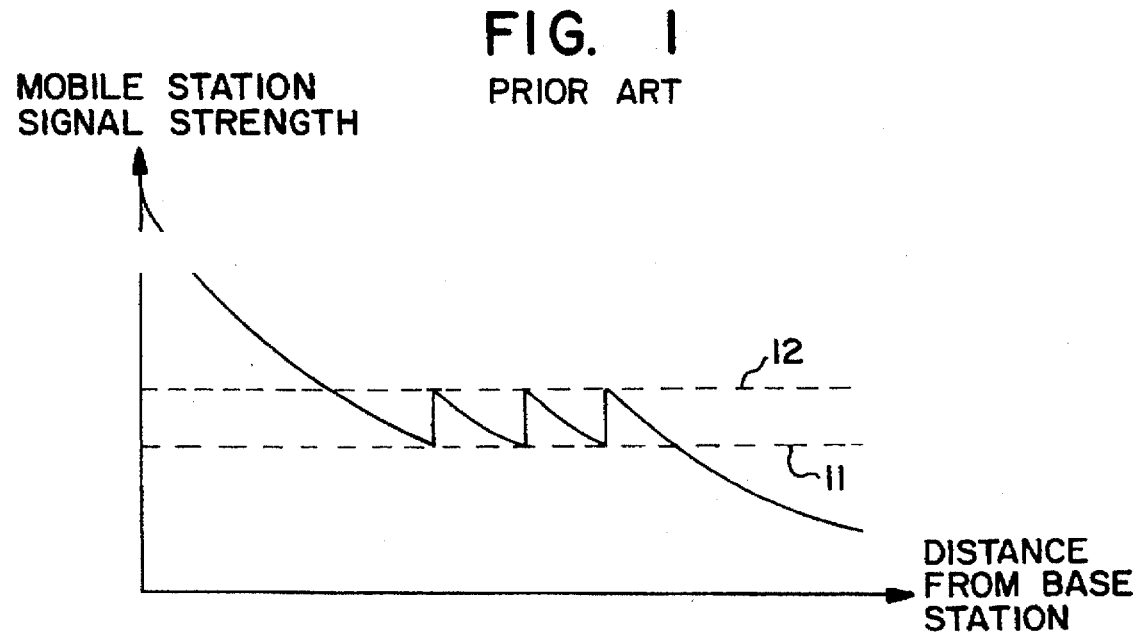
FIG. 1 (Prior art) is a graph of mobile station signal strength at a serving base station as a function of mobile station distance from the base station.

FIG. 1 is a graph of mobile station signal strength at a serving base station as a function of mobile station distance from the base station. Current systems measure the signal strength of mobile stations at the base station, and as a mobile station travels away from its serving base station, the measured signal strength decreases. When the signal strength reaches a minimum acceptable level 11, the output power of the mobile station is increased incrementally, thereby increasing the signal strength received at the base station to an intermediate level 12. The intermediate level 12 is intended to provide acceptable signal strength and acceptable interference levels to other mobile stations. As the mobile station continues to increase its distance from the base station, the signal strength again decreases to the minimum acceptable level, and the output power of the mobile station is again incrementally increased. This process continues until the mobile station is operating at its maximum output capability. If the signal strength then falls to the minimum acceptable level, the mobile station is handed off to another cell, if possible, or the call is dropped.

Figure 2:
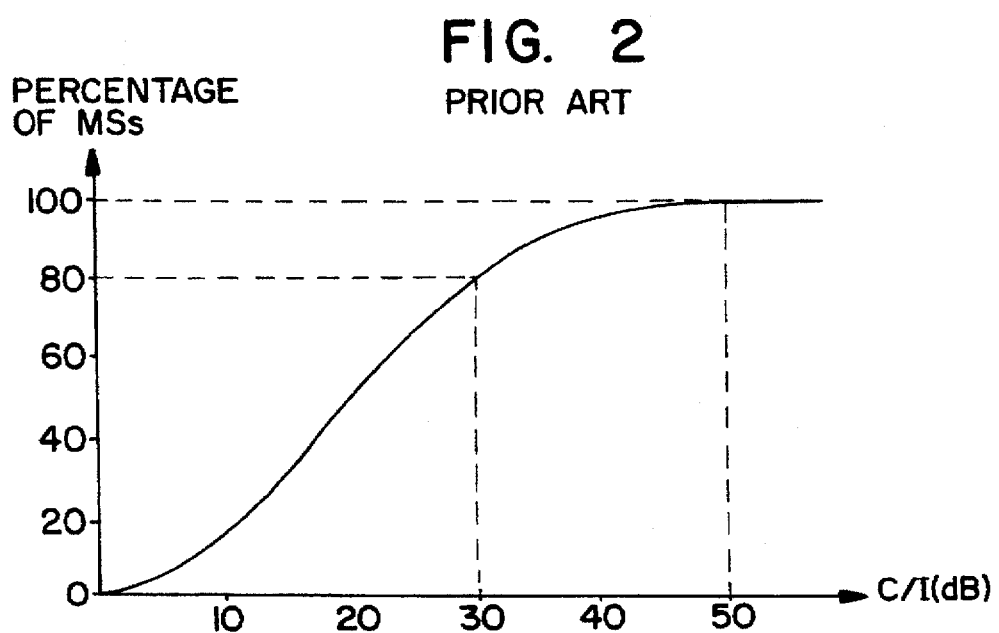
FIG. 2 (Prior art) is a graph of an exemplary cumulative distribution function illustrating the percentage of mobile stations (MSs) in an illustrative cellular telecommunication system that are, at a given time, experiencing a ratio of carrier signal strength to interference (C/I) below corresponding levels.

FIG. 2 is a graph of an exemplary cumulative distribution function illustrating the percentage of mobile stations (MSs) in an illustrative cellular telecommunication system that are, at a given time, experiencing a ratio of carrier signal strength to interference (C/I) below corresponding levels. FIG. 2, which is exemplary only, illustrates, for example, that 100% of the mobile stations are experiencing C/I ratios of 50 dB or lower. Approximately 80% are experiencing C/I ratios of 30 dB or lower. Likewise, almost none of the mobile stations are experiencing a C/I ratio so low that a call cannot be maintained. The C/I ratio is the measurement generally recognized as being indicative of the voice quality on a given cellular radio channel, with higher ratios providing better voice quality. The C/I measurement actually includes a noise factor as well, but in interference-limited environments, the effect of noise on voice quality is negligible when compared to the effect of interference.

Figure 3:
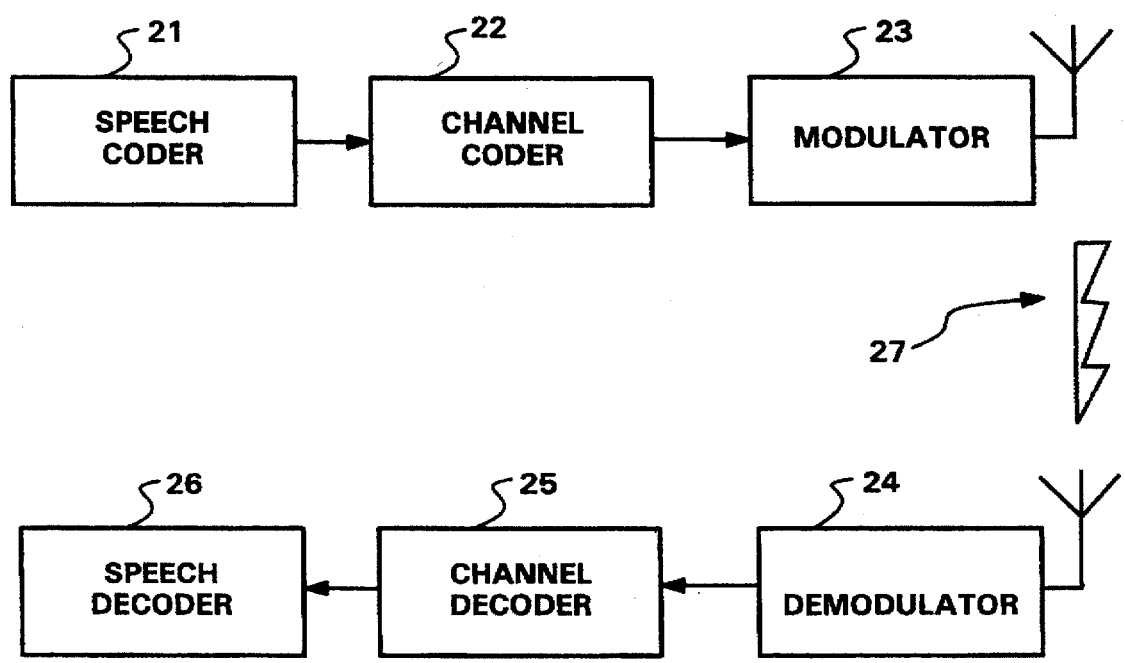
FIG. 3 (Prior art) is a simplified block diagram of the components in a base station and a mobile station in a cellular telecommunication system that contribute to the total user bit rate.

FIG. 3 is a simplified block diagram of the components in a base station and a mobile station in a cellular telecommunication system that contribute to the achievable voice quality. In existing cellular telecommunication systems, the gross bit rate is determined by a combination of the bit rates of a speech coder 21, channel coder 22, and modulator 23 when transmitting; a demodulator 24, channel decoder 25, and speech decoder 26 when receiving; and, for a time division multiple access (TDMA) system, the number of assignable time slots per call in the Air Interface 27. Allowable bit rates for each of the above components are specified by existing telecommunications standards. A large number of possible combinations of bit rates exist, and may be chosen by an operator in order to prioritize either voice quality or robustness.

Figure 3A:
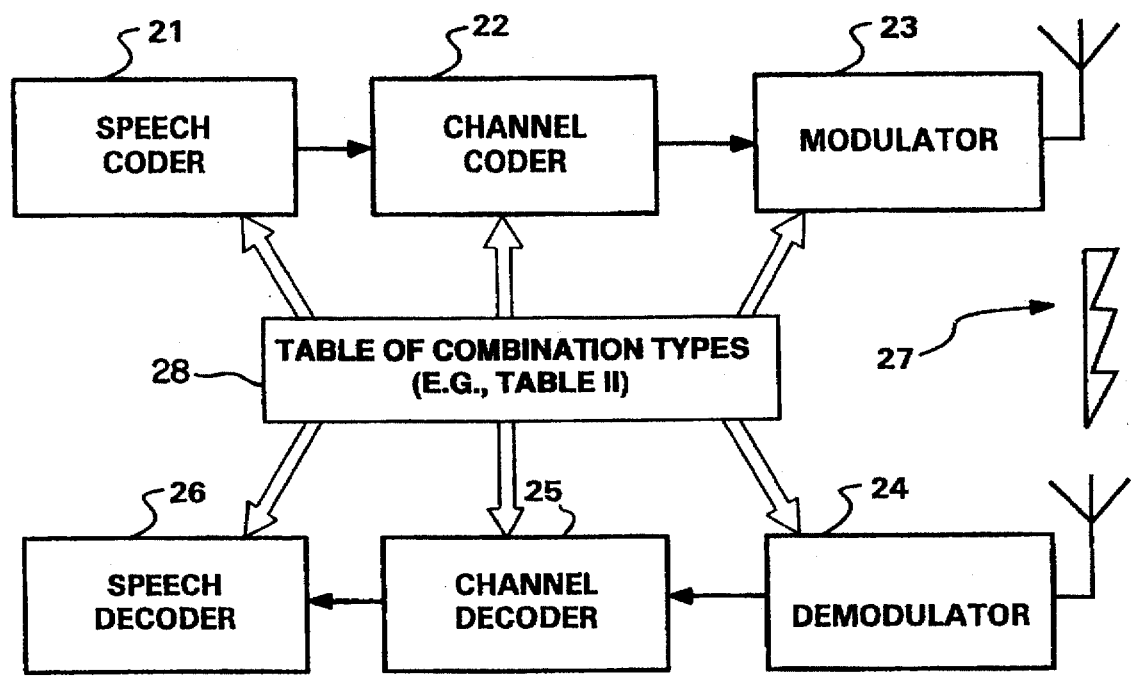
FIG. 3A is a simplified block diagram of the components in a base station and a mobile station that contribute to the total user bit rate, as modified in the present invention.

FIG. 3A is a simplified block diagram of the components in a base station and a mobile station that contribute to the total user bit rate, as modified in the present invention. A table of combination types 28 may be utilized to define combination types and change the bit rate of each of the bit rate components 21–26 by changing from one combination type to another. Table II herein is an exemplary table of combination types. The columns of Table II clearly relate directly to the bit rate components 21–27 in FIGS. 3 and 3A. It can be seen in Table II that changing from Type 4 to Type 5 changes only the speech coder/decoder. Of course, additional columns may be added, and the values in the columns may be arranged, so that changing from one combination type to another type changes only a single one of the other bit rate components. The output of Table II is used to adjust the bit rates of each component utilizing techniques known in the art.

Figure 4:
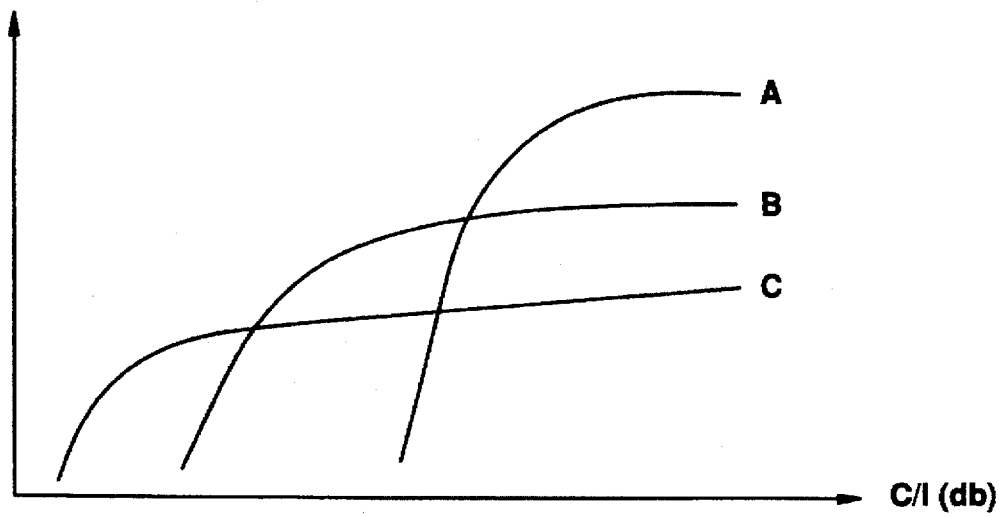
FIG. 4 (Prior art) is a graph of voice quality as a function of carrier signal-to-interference ratio (C/I) for three exemplary combinations of the components of FIG. 3.

FIG. 4 is a graph of voice quality as a function of carrier-to-interference ratio (C/I) for three exemplary combinations of the components of FIG. 3. While only three combinations have been illustrated for simplicity, it should be understood that this is exemplary only, and in practice many more may be utilized.

Combination types A, B, and C are represented as curves illustrating the voice quality attainable for each combination for varying levels of C/I ratio. Combination type A offers the best voice quality of the three user bit rates, but is the least robust and is only useful at the higher levels of C/I. With combination type A, voice quality rapidly deteriorates to an unacceptable level as C/I decreases.

Combination type C, the other extreme, is the most robust. Therefore, as C/I decreases, voice quality under combination type C deteriorates very slowly and combination type C provides the best voice quality at low levels of C/I. However, combination type C sacrifices voice quality at high levels of C/I where its achievable voice quality is the lowest of the three exemplary combinations.

Combination type B offers a compromise between the good voice quality performance of combination type A in areas of high C/I and the robustness of combination type C. Combination type B may offer higher voice quality in the middle ranges of C/I than either combination type A or C. At high levels of C/I, combination type B offers higher voice quality than combination type C, but lower voice quality than combination type A. In areas of low C/I, combination type B offers higher voice quality than combination type A, but lower voice quality than combination type C. Combinations similar to combination type B are most often utilized by cellular air interface standards since those combinations offer medium performance throughout most of the C/I range normally experienced.

Figure 5:
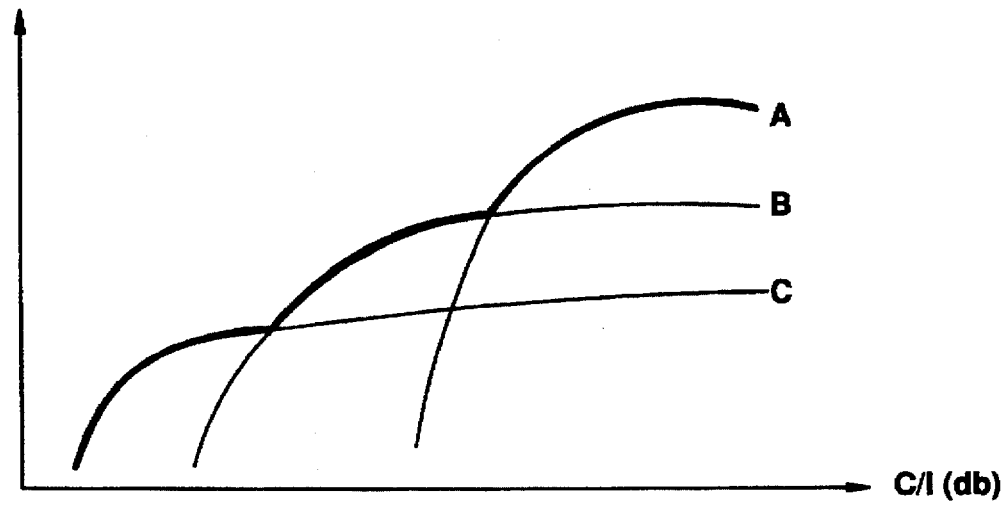
FIG. 5 is a graph of voice quality as a function of carrier signal-to-interference ratio (C/I) illustrating the effect on voice quality provided by adaptive selection of the optimum combination of the components of FIG. 3 at varying levels of C/I ratio.

FIG. 5 is a graph of voice quality as a function of carrier signal-to-interference ratio (C/I) illustrating the effect on voice quality provided by adaptive selection of the optimum combination of the components of FIG. 3 at varying levels of C/I ratio. Adaptive selection provides a cellular radio system with achievable voice quality illustrated by the bold curve in FIG. 5. In the system of the present invention, the instantaneous radio channel quality (i.e., C/I ratio) is continuously monitored. The voice quality and required level of robustness for the measured C/I ratio are known for each of the combination types A, B, and C discussed above. The system dynamically responds to the measured C/I by selecting whichever of the combination types A, B, or C gives the maximum voice quality for the required robustness at the measured C/I level. Thus, using the exemplary curves of FIGS. 4 and 5, the system utilizes combination type A at high levels of C/I, combination type B at intermediate levels of C/I, and combination type C at low levels of C/I. Therefore, voice quality is dynamically maximized.

The present invention includes a control algorithm that selects the best combination for a given level of C/I. The control algorithm is based on "cost functions" which provide for simple and stable decision making. The switching between different combinations may be controlled by either the cellular system or by the mobile stations.

One of the current TDMA standards in North America (IS-136) specifies a three time slot structure, i.e., every third time slot is allocated to one particular user. The voice quality curves for FIGS. 4 and 5 are illustrative of the achievable voice quality when utilizing a single time slot out of three for each user. Additional time slots may be allocated to a single user, but such an allocation adversely impacts the capacity of the system by decreasing the number of users per frequency. However, allocating additional time slots to a user implicitly increases bandwidth to that particular user and improves voice quality. It may be desirable, therefore, to allocate additional time slots to each user during periods of low traffic density when system capacity is not a problem. Therefore, the control program of the present invention is enhanced by using "tariffs" (sets of cost functions), depending on the current load and the category of subscriber. This provides the cellular system operator with the ability to trade off voice quality for system capacity, or provide additional bandwidth to subscribers who are willing to pay a premium for additional capabilities.

Figure 6:
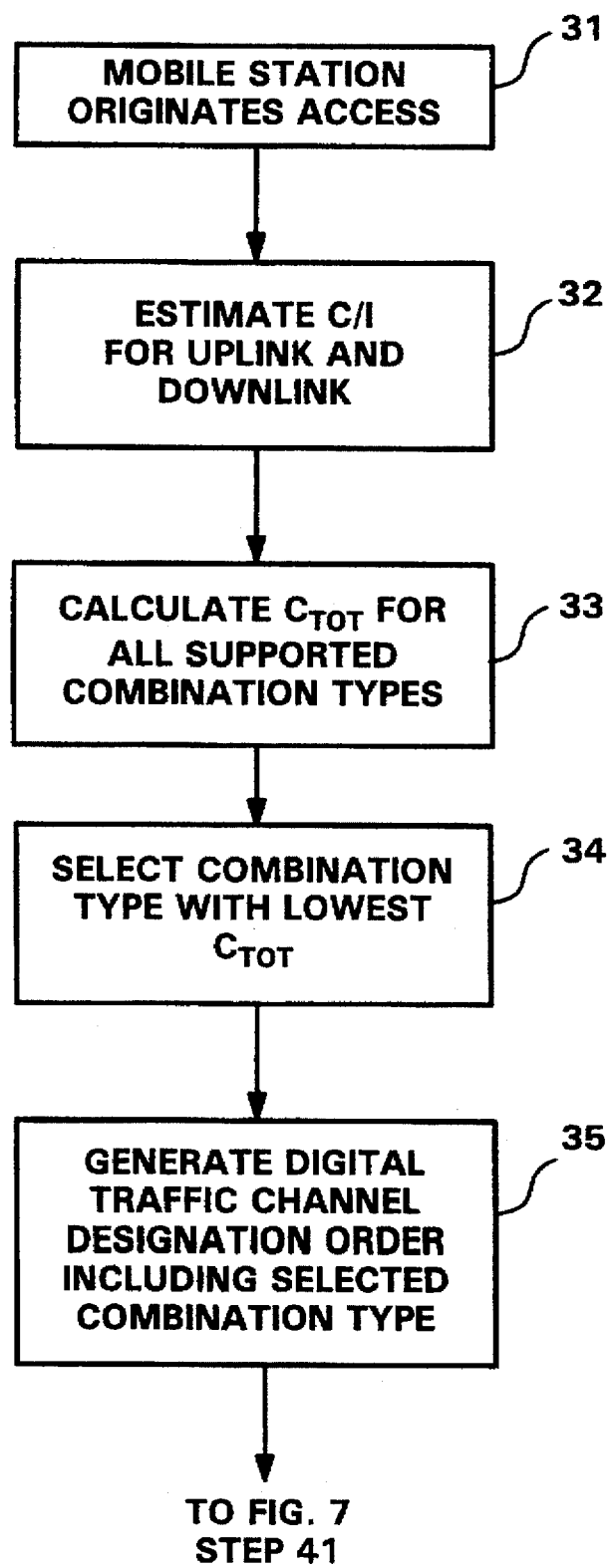
FIG. 6 is a flow chart illustrating the functions performed by the control program of the present invention when dynamically selecting a combination type during call setup.

FIG. 6 is a flow chart illustrating the functions performed by the control program of the present invention when dynamically selecting a combination type during call setup. The program starts at step 31 where the mobile station originates access to the cellular telecommunications network. The program then moves to step 32 and estimates the radio channel quality (RCQ) (e.g., C/I) based on idle channel measurements, for both the uplink signal (from the mobile station to the base station) and the downlink signal (from the base station to the mobile station). At step 33, the program calculates the total cost ($C_{TOT}$) for all user bit rate combination types that are supported by both the cellular network and the mobile station. At step 34, the program selects the combination type with the lowest total cost to utilize for the uplink and the downlink transmissions. The program then generates a Digital Traffic Channel (DTC) designation order at step 35 which includes information concerning the combination type to utilize for the uplink and the downlink transmissions. The program then moves to step 41 in FIG. 7A.

Figure 7A:
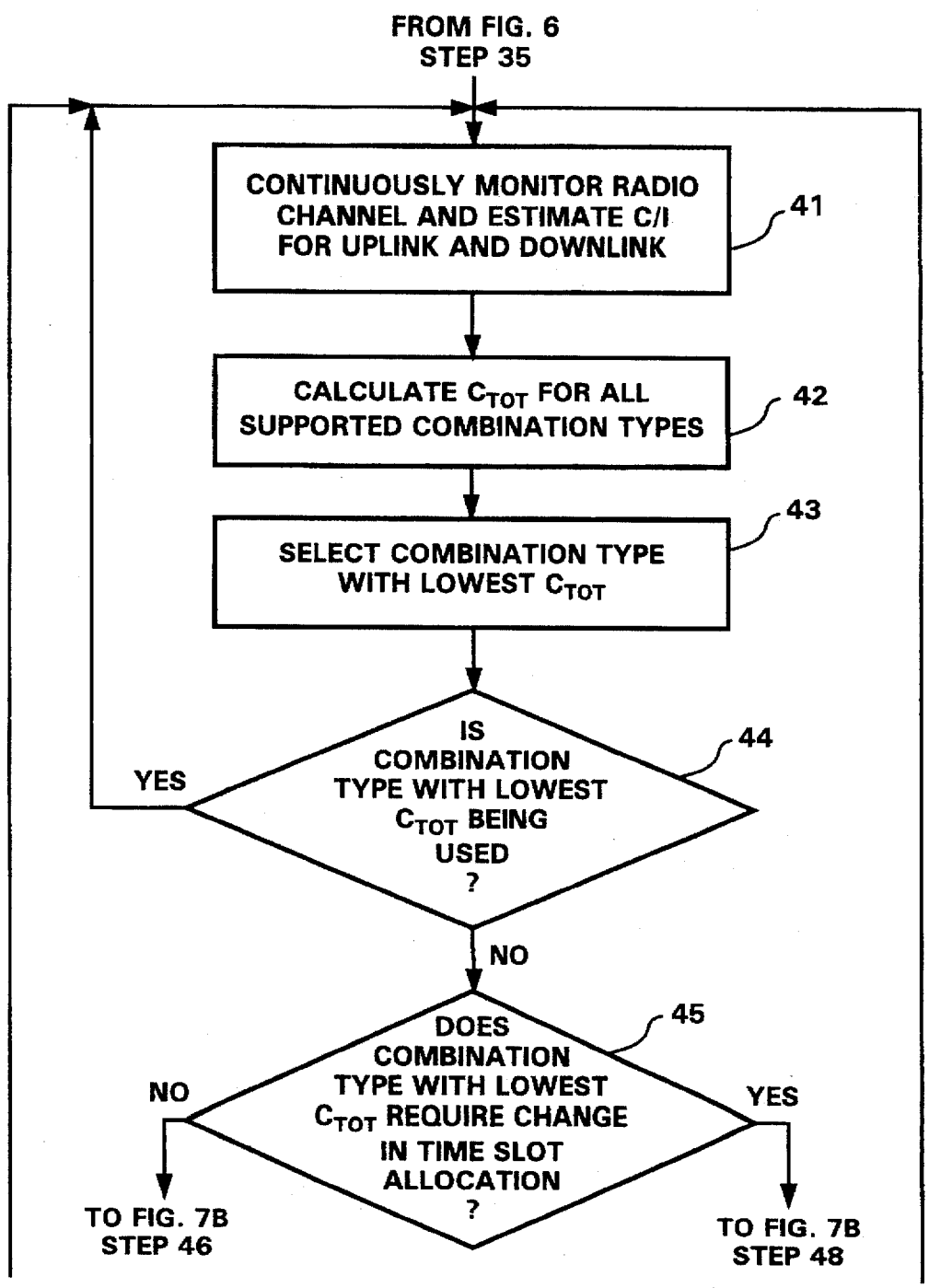
FIGS. 7A and 7B are a flow chart illustrating the functions performed by the control program of the present invention when dynamically selecting a combination type during a call in progress.
Figure 7B:
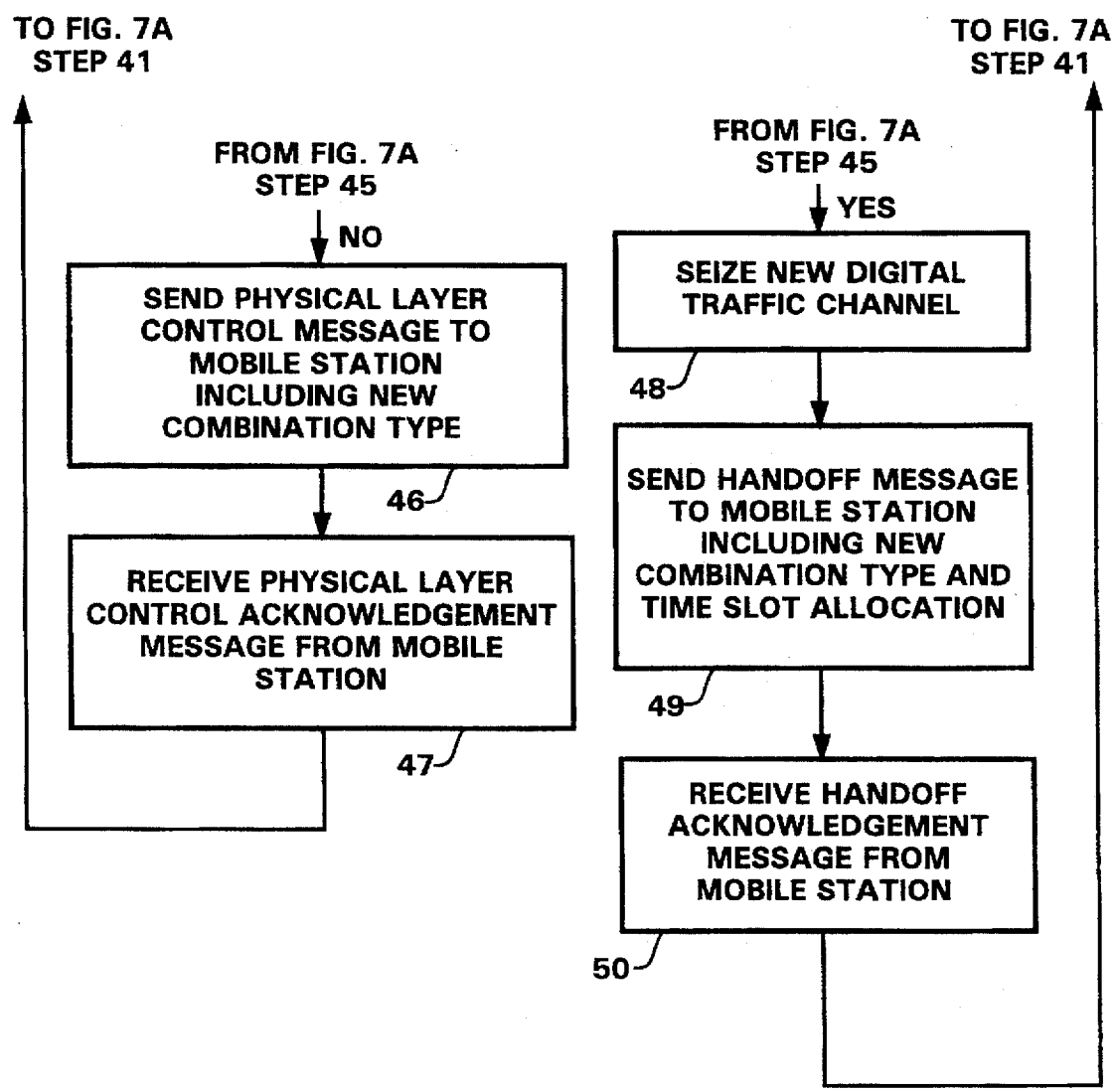

FIGS. 7A and 7B are a flow chart illustrating the functions performed by the control program of the present invention when dynamically selecting a combination type during a call in progress. At step 41, the program continuously monitors the radio channel and estimates radio channel quality (C/I) for both the uplink and the downlink. At step 42, the program calculates the total cost ($C_{TOT}$) for all user bit rate combination types that are supported by both the cellular network and the mobile station. At step 43, the program selects the combination type with the lowest total cost to utilize for the uplink and the downlink transmissions. At step 44, it is determined whether or not the combination type with the lowest $C_{TOT}$ is currently being utilized in the uplink and the downlink. If it is determined that the combination type with the lowest $C_{TOT}$ is currently being utilized in the uplink and the downlink, then no action is taken, and the program returns to step 41 and continues to monitor the radio channel and estimate radio channel quality.

If at step 44, however, it is determined that the combination type with the lowest $C_{TOT}$ is not currently being utilized in the uplink and the downlink, then the program performs the functions required to change the uplink and the downlink to a new user bit rate combination type. To accomplish this, the program first moves to step 45 and determines whether or not the combination type with the lowest $C_{TOT}$ requires a change in time slot allocation. If no change in time slot allocation is required, then the program moves to FIG. 7B, step 46 and sends to the mobile station a Physical Layer Control message which includes information about the new combination type to utilize in the uplink and the downlink. The switch to the new combination type is complete when the program receives a Physical Layer Control Acknowledgement message at step 47. The program then returns to FIG. 7A, step 41 and continues to monitor the radio channel and estimate radio channel quality.

If at step 45, however, it is determined that the combination type with the lowest $C_{TOT}$ requires a change in time slot allocation, then a handoff is initiated. The program first moves to FIG. 7B, step 48 and seizes a new digital traffic channel. The program then moves to step 49 and sends to the mobile station a Handoff message which includes information about the new combination type (including new time slot allocation) to utilize in the uplink and the downlink. The switch to the new combination type is complete when the program receives a Handoff Acknowledgement message at step 50. The program then returns to FIG. 7A, step 41 and continues to monitor the radio channel and estimate radio channel quality.

The control program continuously monitors and measures radio channel conditions which determine radio channel quality (RCQ) for both the uplink and the downlink, as well as other cellular network conditions which may influence achievable voice quality. These conditions may include, for example:

Radio Channel Conditions:
Bit Error Rate (BER)—uplink;
Bit Error Rate (BER)—downlink;
Signal Strength (SS)—uplink; and
Signal Strength (SS)—downlink.
Cellular Network Conditions:
Available Time Slots;
Mobile Station (MS) Capability;
Cellular System Capability; and
Tariffs.

The control program monitors these conditions and, based on its measurements, optimizes the voice quality for each individual call, in order to achieve the best possible quality within the given resources (e.g., time slots, MS capability, etc.) of the cellular system. Cost functions are introduced in order to provide a flexible trade-off between system capacity and voice quality. The above measured factors are input to the control program which then applies the cost functions to select the combination type that minimizes the total cost.

The control program estimates the current radio channel quality (C/I) based on Bit Error Rate (BER) estimates (uplink and downlink) and Signal Strength (SS) estimates (uplink and downlink). The control program may utilize a look-up table similar to Table I below to translate BER to C/I.

| UPLINK | | DOWNLINK | |
|---|---|---|---|
| BER (%) | C/I (dB) | BER (%) | C/I (dB) |
| 10 | 7 | 10 | 10 |
| 5 | 9 | 5 | 13 |
| 3 | 11 | 3 | 17 |

DETAILED EXAMPLE

A detailed example is hereinafter described to illustrate a typical implementation of the present invention. In this example, a total of five (5) combination types are available for use in the cellular network. The five combination types are defined in Table II below:

| Type | Time Slots[a] | Modulation | Voice Coder Algorithm, Rate (kbps) | | Total Data Rate[b] (kbps) |
|---|---|---|---|---|---|
| 1 | 5 | 8PSK | ADPCM | 32 | 56.75 |
| 2 | 5 | π/4 QPSK | LDCELP | 16 | 37.8 |
| 3 | 2 | 8PSK | LDCELP | 16 | 19.5 |
| 4[c] | 2 | π/4 QPSK | VSELP | 7.95 | 13 |
| 5 | 2 | π/4 QPSK | EVCELP[d] | 4.0 | 13 |

[a]Number of IS-136 air interface time slots per 40 ms (out of 6)
[b]Including voice coder rate and Forward Error Correction (FEC) coding
[c]IS-136 full rate
[d]Enhanced VSELP The following glossary expands the terms utilized in the table:

| PSK | Phase Shift Keying |
|---|---|
| QPSK | Quadrature Phase Shift Keying |
| ADPCM | Adaptive Differential Pulse Code Modulation |
| LDCELP | Low Delay Code Excited Linear Predictive coding |
| VSELP | Vector Sum Excited Linear Predictive coding |

Combination types 1 and 2 are optimized for indoor/office applications where the system capacity per frequency is less of a problem because, for example, microcells may be implemented in order to obtain the required capacity. Combination types 3, 4, and 5 are optimized for outdoor/wide area applications where maximum capacity per cell/frequency is required.

Figure 8:
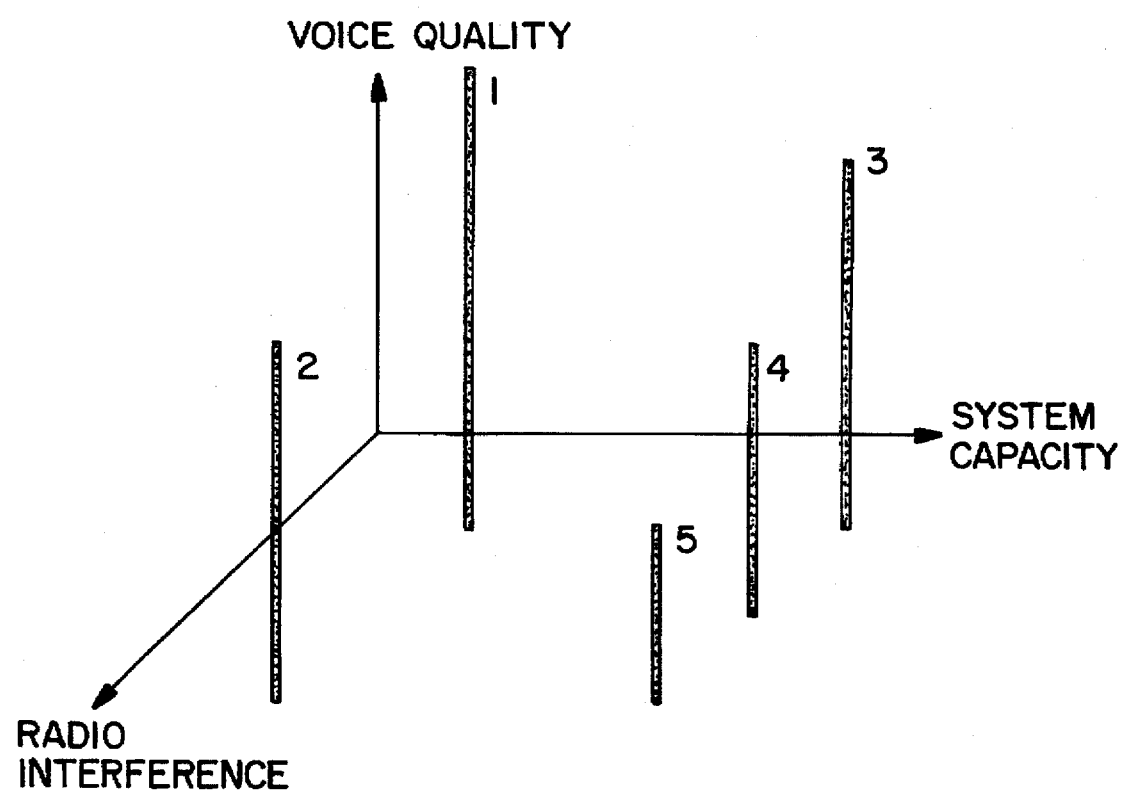
FIG. 8 is a 3-dimensional graphical presentation illustrating the achievable voice quality levels of the five exemplary combination types in varying conditions of radio interference and cellular system capacity.

FIG. 8 is a 3-dimensional graphical presentation illustrating the achievable voice quality levels of the five exemplary combination types in varying conditions of radio interference and cellular system capacity. Combination types 1 and 3 provide very good voice quality in good radio conditions (high C/I ratio) and at different levels of cellular system capacity. Combination types 2, 4, and 5 provide optimal voice quality in various levels of degraded radio conditions (lower C/I ratios) and at different levels of cellular system capacity.

Figure 9:
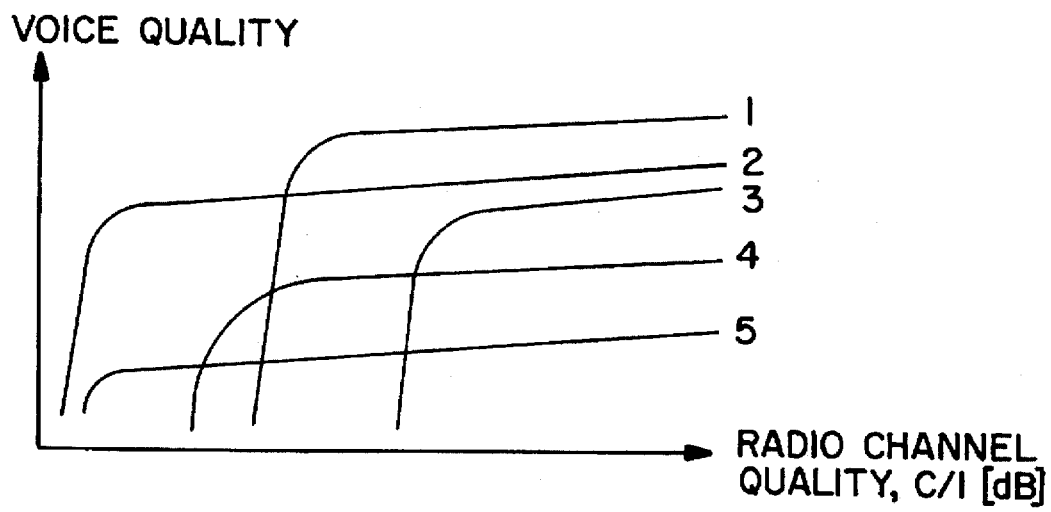
FIG. 9 is a graph of voice quality as a function of radio channel quality (RCQ) or C/I for the five exemplary combination types of Table II.

FIG. 9 is a graph of voice quality as a function of radio channel quality (RCQ) or C/I for the five exemplary combination types of Table II. Each curve represents one of the combination types, as indicated. It can be seen from FIG. 9 that combination types 2 and 5 are the most robust, offering degraded, but acceptable voice quality at the lower levels of C/I. Curves 1 and 3, conversely, offer good voice quality at high levels of C/I, but degrade rapidly to unacceptable voice quality at lower levels of C/I.

Figure 10:
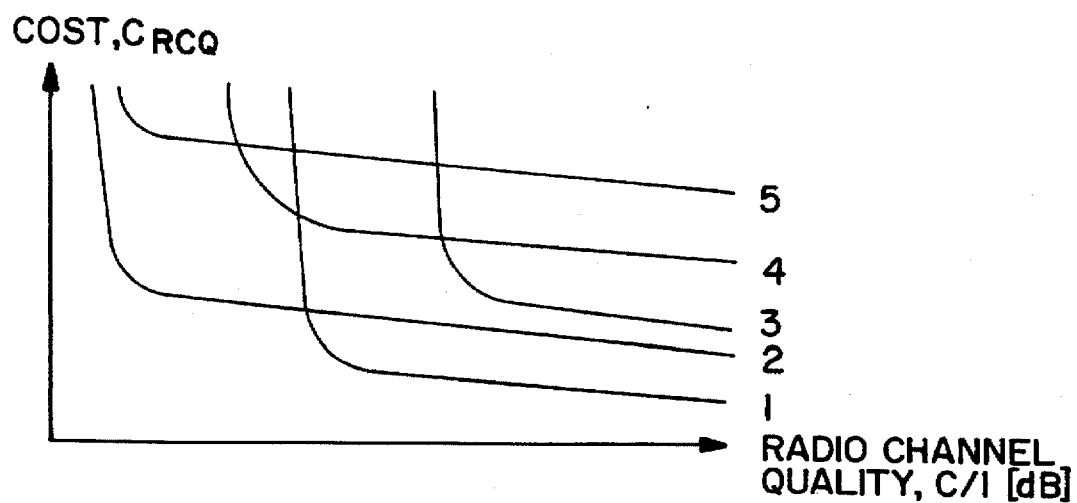
FIG. 10 is a graph of Cost ($C_{RCQ}$) as a function of radio channel quality (RCQ) or C/I for the five exemplary combination types of Table II.

FIG. 10 is a graph of Cost ($C_{RCQ}$) as a function of radio channel quality (RCQ) or C/I for the five exemplary combination types of Table II. Each curve represents one of the combination types, as indicated. The curves illustrate that it is more costly to achieve acceptable voice quality at lower levels of C/I than it is to achieve acceptable voice quality at higher levels of C/I. This fact results in cost curves for the five combination types that are essentially the inverse of the voice quality curves of FIG. 9. Therefore, by selecting the lowest cost curve for a given radio channel quality (C/I), the combination type providing the best voice quality is also chosen.

Figure 11:
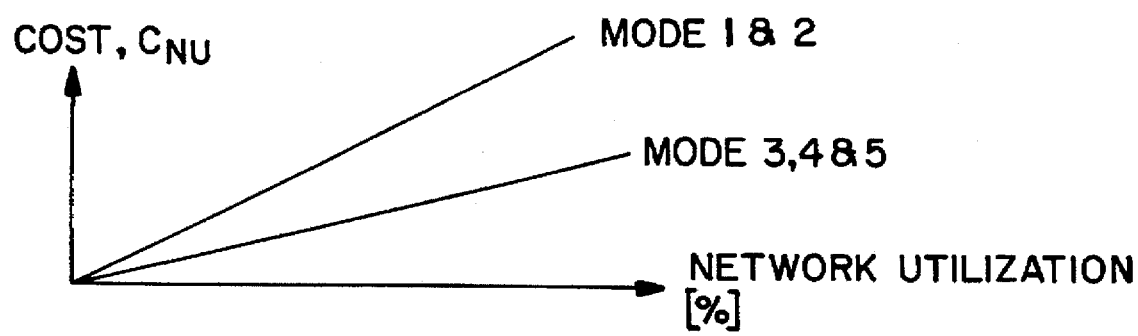
FIG. 11 is a graph of Cost ($C_{NU}$) as a function of network utilization (NU)

FIG. 11 is a graph of Cost ($C_{NU}$) as a function of cellular network utilization (NU). The curves represent combination types as indicated. The curves in FIG. 11 illustrate that it is more costly to allocate additional time slots to each user during periods of high network utilization. This occurs because there are fewer time slots available for increasing voice quality due to their utilization to serve more users.

Figure 12:
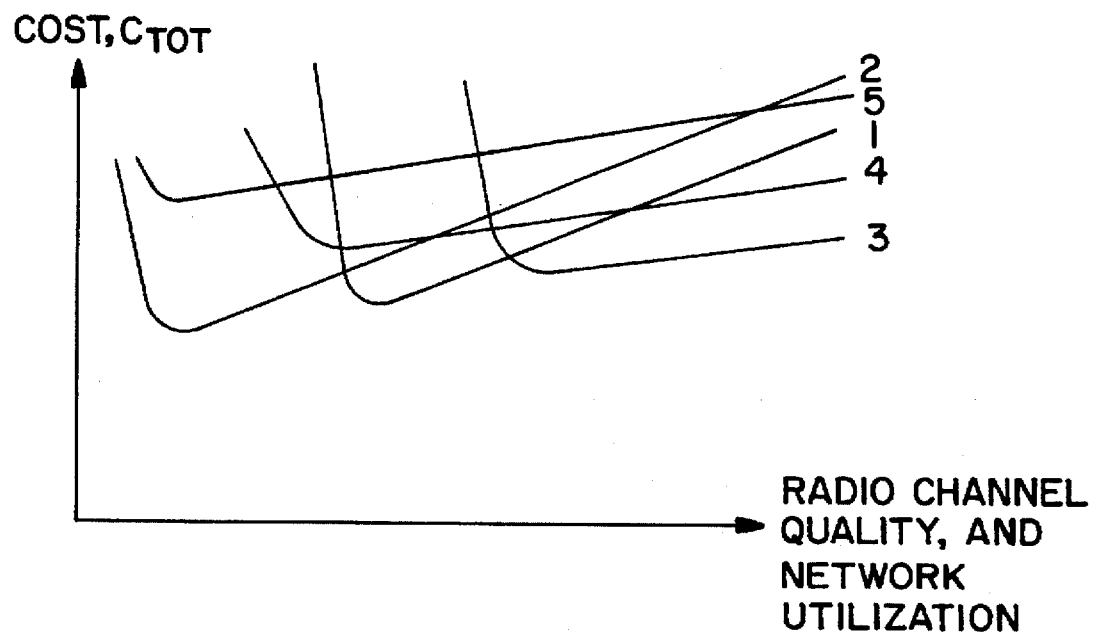
FIG. 12 is a graph of Total Cost ($C_{TOT}$) as a function of both radio channel quality and network utilization.

FIG. 12 is a graph of Total Cost ($C_{TOT}$) as a function of both radio channel quality and network utilization. The total cost ($C_{TOT}$) for each combination type is the sum of $C_{RCQ}$ and $C_{NU}$ for that combination. As noted above, the control program continuously monitors radio channel quality and network utilization, and selects the lowest total cost curve. This results in the selection of the combination type providing the best voice quality within the constraints of the cellular network resources.

Figure 13:
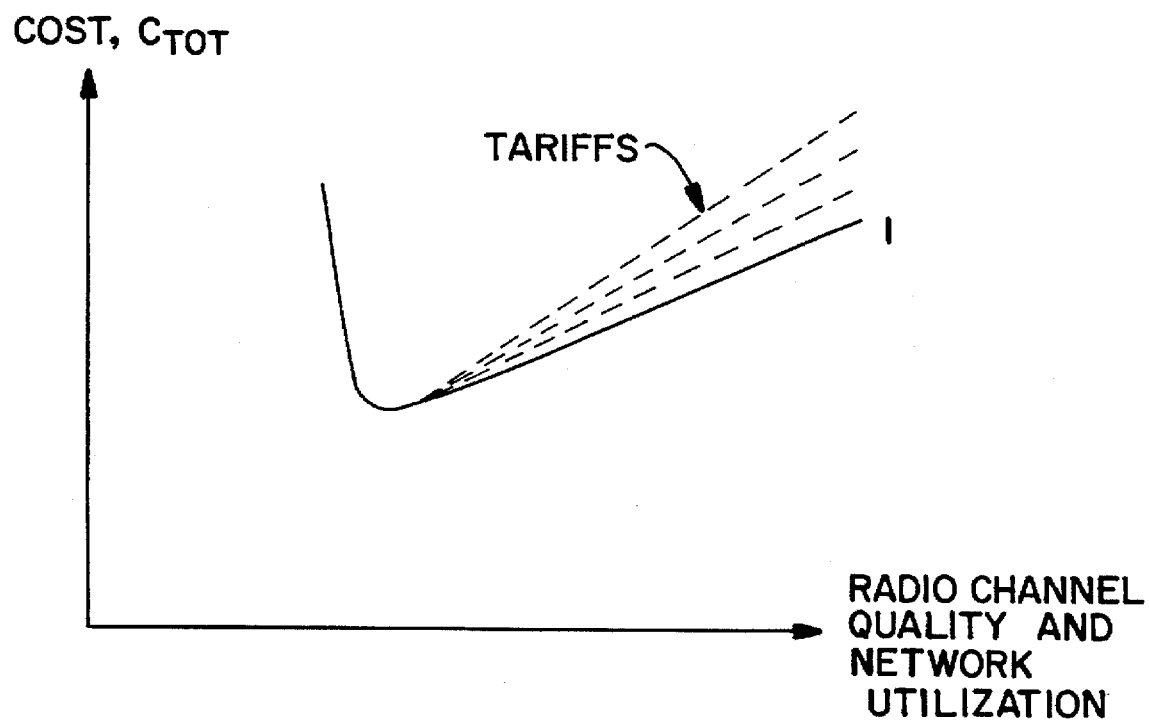
FIG. 13 is a graph of the total cost ($C_{TOT}$) curve for combination type 1 and illustrating the application of different "tariffs" to the total cost curve.

FIG. 13 is a graph of the total cost ($C_{TOT}$) curve for combination type 1 and illustrating the application of different "tariffs" to the total cost curve. Tariffs provide the cellular system operator with the ability to tailor network usage to groups of subscribers with different priority levels. Achieving this level of voice quality may require access to a combination type that utilizes additional time slots. By levying tariffs on the total cost function, the system operator can offer this service to those subscribers who are willing to pay increased charges to obtain the additional time slots. The operator can also control the size of the tariffs, thereby having greater tariffs during periods of high system utilization when available time slots are scarce. Thus, tariffs adjust the total cost function depending on network utilization, radio channel quality, and demand for network resources.

It is thus believed that the operation and construction of the present invention will be apparent from the foregoing description. While the method, apparatus and system shown and described has been characterized as being preferred, it will be readily apparent that various changes and modifications could be made therein without departing from the spirit and scope of the invention as defined in the following claims.

What is claimed is:

1. A system for dynamically optimizing voice quality in a digital cellular radio telecommunications network, said network having a plurality of user bit rate components that operate at set bit rates, and said network utilizing a plurality of radio channels to carry calls, said system comprising:

means for monitoring and measuring conditions on each of said radio channels, said means for monitoring and measuring having means for continuously monitoring and measuring said conditions;

means for estimating current radio channel quality for each of said radio channels;

means for changing the bit rates of each of said plurality of user bit rate components;

means for dynamically controlling said means for changing bit rates in order to provide the maximum achievable voice quality for calls on each of said radio channels; and means for monitoring and measuring cellular network conditions that influence achievable voice quality, wherein said cellular network conditions that influence achievable voice quality include: mobile station (MS) capability; cellular network capability; and tariffs.

2. A system for dynamically optimizing voice quality in a digital cellular radio telecommunications network, said network having a plurality of user bit rate components that operate at set bit rates, and said network utilizing a plurality of radio channels to carry calls, said system comprising:

means for monitoring and measuring conditions on each of said radio channels, said means for monitoring and measuring including:

means for continuously monitoring and measuring conditions on each of said radio channels, said means for continuously monitoring and measuring including:
  means for continuously monitoring and measuring bit error rates (BER) and signal strengths (SS);
means for estimating current radio channel quality for each of said radio channels;
means for changing the bit rates of each of said plurality of user bit rate components, said plurality of user bit rate components including a speech encoder, a channel encoder, a modulator, a speech decoder, a channel decoder, and a demodulator, wherein said bit rates are changed by switching between a plurality of combination types, each of said plurality of combination types comprising a defined bit rate for each of said plurality of user bit rate components;
means for dynamically controlling said means for changing bit rates in order to provide the maximum achievable voice quality for calls on each of said radio channels, said means for dynamically controlling said means for changing bit rates including:
  means for defining a plurality of cost functions, each of said cost functions corresponding to one of said plurality of combination types; and
  means for identifying and selecting a cost function that provides the lowest cost for said measured radio channel condition; and
means for monitoring and measuring cellular network conditions that influence achievable voice quality.

3. The system for dynamically optimizing voice quality in a digital cellular radio telecommunications network of claim 2 wherein said means for defining a plurality of cost functions includes:
  means for defining cost as a function of radio channel quality;
  means for defining cost as a function of cellular network utilization; and
  means for adding said cost as a function of radio channel quality and said cost as a function of cellular network utilization to obtain a total cost function for each of said plurality of combination types.

4. The system for dynamically optimizing voice quality in a digital cellular radio telecommunications network of claim 3 wherein said means for defining a plurality of cost functions includes means for applying tariffs to the total cost function for each of said plurality of combination types, said tariffs adjusting said total cost functions depending on network utilization, radio channel quality, and demand for network resources.

5. A system for dynamically optimizing voice quality in a time division multiple access (TDMA) cellular radio telecommunications network, said network having a plurality of user bit rate components that operate at set bit rates, and said network utilizing a plurality of time slots to carry a plurality of calls on each radio channel, said system comprising:
  means for monitoring and measuring conditions on each of said radio channels, said means for monitoring and measuring conditions including means for continuously monitoring and measuring said conditions;
  means for estimating current radio channel quality for each of said radio channels;
  means for changing the bit rates of each of said plurality of user bit rate components;
  means for allocating time slots to selected calls;
  means for dynamically controlling said means for changing bit rates and said means for allocating time slots in order to provide the maximum achievable voice quality for calls on each of said radio channels; and
  means for monitoring and measuring cellular network conditions that influence achievable voice quality, said cellular network conditions that influence achievable voice quality including available time slots, mobile station (MS) capability, cellular network capability, and tariffs.

6. A system for dynamically optimizing voice quality in a time division multiple access (TDMA) cellular radio telecommunications network, said network having a plurality of user bit rate components that operate at set bit rates, and said network utilizing a plurality of time slots to carry a plurality of calls on each radio channel, said system comprising:
  means for monitoring and measuring conditions on each of said radio channels, said means for monitoring and measuring conditions including:
    means for continuously monitoring and measuring conditions on each of said radio channels, said means for continuously monitoring and measuring conditions including:
      means for continuously monitoring and measuring bit error rates (BER) and signal strengths (SS);
  means for estimating current radio channel quality for each of said radio channels;
  means for changing the bit rates of each of said plurality of user bit rate components; said user bit rate components including a speech encoder, a channel encoder, a modulator, a speech decoder, a channel decoder, and a demodulator;
  means for allocating time slots to selected calls;
  means for dynamically controlling said means for changing bit rates and said means for allocating time slots in order to provide the maximum achievable voice quality for calls on each of said radio channels, said means for dynamically controlling said means for changing bit rates and said means for allocating additional time slots including:
    means for defining a plurality of combination types, each of said plurality of combination types comprising:
      a bit rate setting for each of said plurality of user bit rate components; and
      an allocation of time slots for each call;
    means for defining a plurality of cost functions, each of said cost functions corresponding to one of said plurality of combination types; and
    means for identifying and selecting a cost function that provides the lowest cost for said measured radio channel conditions; and
  means for monitoring and measuring cellular network conditions that influence achievable voice quality.

7. The system for dynamically optimizing voice quality in a time division multiple access (TDMA) cellular radio telecommunications network of claim 6 wherein said means for defining a plurality of cost functions includes:
  means for defining cost as a function of radio channel quality;
  means for defining cost as a function of cellular network utilization; and
  means for adding said cost as a function of radio channel quality and said cost as a function of cellular network utilization to obtain a total cost function for each of said plurality of combination types.

8. The system for dynamically optimizing voice quality in a time division multiple access (TDMA) cellular radio telecommunications network of claim 7 wherein said means for defining a plurality of cost functions includes means for applying tariffs to the total cost function for each of said plurality of combination types, said tariffs adjusting said total cost functions depending on network utilization, radio channel quality, and demand for network resources.

9. A method of dynamically optimizing voice quality in a time division multiple access (TDMA) cellular radio telecommunications network, said network having a plurality of user bit rate components that operate at independently set bit rates, and said network utilizing a plurality of time slots to carry a plurality of calls on each radio channel, said method comprising the steps of:

monitoring and measuring conditions on each of said radio channels, said monitoring and measuring step including continuously monitoring and measuring said conditions;

estimating current radio channel quality for each of said radio channels;

dynamically changing said bit rates and allocating time slots, thereby providing the maximum achievable voice quality for calls on each of said radio channels; and monitoring and measuring cellular network conditions that influence achievable voice quality, said step of monitoring and measuring cellular network conditions including monitoring and measuring available time slots, mobile station (MS) capability, cellular network capability, and tariffs.

10. A method of dynamically optimizing voice quality in a time division multiple access (TDMA) cellular radio telecommunications network, said network having a plurality of user bit rate components that operate at independently set bit rates, and said network utilizing a plurality of time slots to carry a plurality of calls on each radio channel, said method comprising the steps of:

monitoring and measuring conditions on each of said radio channels, said monitoring and measuring step including:

continuously monitoring and measuring conditions on each of said radio channels, said step of continuously monitoring and measuring including:

continuously monitoring and measuring bit error rates (BER) and signal strengths (SS);

estimating current radio channel quality for each of said radio channels;

dynamically changing said bit rates and allocating time slots, thereby providing the maximum achievable voice quality for calls on each of said radio channels, said step of dynamically changing the bit rates and allocating time slots including the steps of:

changing the bit rates of a speech coder, a channel coder, a modulator, a speech decoder, a channel decoder, and a demodulator;

defining a plurality of combination types, said defining step further comprising:

setting a bit rate for each of said plurality of user bit rate components; and allocating a number of time slots for each call;

defining a plurality of cost functions, each of said cost functions corresponding to one of said plurality of combination types; and identifying and selecting a cost function that provides the lowest cost for said measured radio channel conditions; and monitoring and measuring cellular network conditions that influence achievable voice quality.

11. The method of dynamically optimizing voice quality in a time division multiple access (TDMA) cellular radio telecommunications network of claim 10 wherein said step of defining a plurality of cost functions includes:

defining cost as a function of radio channel quality;

defining cost as a function of cellular network utilization; and adding said cost as a function of radio channel quality and said cost as a function of cellular network utilization to obtain a total cost function for each of said plurality of combination types.

12. The method of dynamically optimizing voice quality in a time division multiple access (TDMA) cellular radio telecommunications network of claim 11 wherein said step of defining a plurality of cost functions includes applying tariffs to the total cost function for each of said plurality of combination types, said tariffs adjusting said total cost functions depending on network utilization, radio channel quality, and demand for network resources.

* * * * *